United States Patent [19]

Motoyama

[11] Patent Number: 5,638,186
[45] Date of Patent: *Jun. 10, 1997

[54] MULTI-FUNCTION MACHINE FOR COMBINING AND ROUTING IMAGE DATA

[75] Inventor: Tetsuro Motoyama, San Jose, Calif.

[73] Assignees: Ricoh Company Ltd.; Ricoh Corporation, both of San Jose, Calif.

[*] Notice: The term of this patent shall not extend beyond the expiration date of Pat. No. 5,396,345.

[21] Appl. No.: 377,480

[22] Filed: Jan. 24, 1995

Related U.S. Application Data

[63] Continuation-in-part of Ser. No. 811,463, Dec. 19, 1991, Pat. No. 5,396,345.
[51] Int. Cl.$^6$ .................................................. H04N 1/387
[52] U.S. Cl. ........................... 358/448; 355/133; 358/443; 358/401; 380/6
[58] Field of Search .............................. 358/400, 401, 358/403, 407, 434, 436, 439, 443, 447, 448, 450, 452, 467, 470, 471, 476, 300; 395/147, 135; 380/3, 6, 7, 10, 18; 355/133; H04N 1/387

[56] References Cited

U.S. PATENT DOCUMENTS

| | | | |
|---|---|---|---|
| 4,586,811 | 5/1986 | Kubo | 355/14 R |
| 5,257,119 | 10/1993 | Funada et al. | 358/450 |

FOREIGN PATENT DOCUMENTS

| | | | |
|---|---|---|---|
| 0038513 | 3/1980 | Japan | 355/133 |
| 0176668 | 10/1983 | Japan | 355/133 |

OTHER PUBLICATIONS

The Ricoh DS5330 Digital Copier/Printer Product Literature, Nov., 1992.

Munzel; Document Security, 1977; p. 820; IBM Tech Disc. vol. 20 No. 1.

Weinberg; Document Copying Inhibitor Method; IBM Tech Discl. vol. 17 No. 12 May 75 p. 3786.

Hobgood, Jr.; Secure Document Feature for Copy Machines; IBM Tech. Discl. vol. 15, No. 2 (Jul. 1972) pp. 453–454.

Hildenbrandt; Document Security for Copiers; IBM Tech Discl. vol. 19 No. 9 (Feb. 1977) pp. 3293–3294.

*Primary Examiner*—Edward L. Coles, Sr.
*Assistant Examiner*—Jerome Grant, II
*Attorney, Agent, or Firm*—Flehr Hohbach Test Albritton & Herbert LLP

[57] ABSTRACT

A multi-function machine for combining and routing image data is disclosed. The multi-function machine includes a number of functional units, for instance, a digital copier which produces scanned image data, a printer which prints image data from a computer, and a facsimile device which receives and sends facsimile image data. Image data from one or a number of sources may be combined to form merged image data, corresponding to a merger of the individual images. The merged image data may then be conveyed to any of a number of user selectable destinations, including a printer, a host computer, or a facsimile device.

22 Claims, 10 Drawing Sheets

1. Confidential (H)
2. Confidential (D)
3. Date
4. Date and Time
5. Identification #
6. Confidential (H)/ID
7. Confidential (D)/ID

Enter ID # _____

Increment (Yes - 1; No - 2) ___

The Constitution of the United States

PREAMBLE

We, the people of the United States, in order to form a more perfect Union, establish justice, insure domestic tranquility, provide for the common defense, promote the general welfare, and secure the blessings of liberty to ourselves and our posterity, do ordain and establish this Constitution for the United States of America.

ARTICLE I

Section 1. Legislative powers; in whom vested

All legislative powers herein granted shall be vested in a Congress of the United States, which shall consist of a Senate and House of Representatives.

Section 2. House of Representatives, how and by whom chosen. Qualifications of a Representative. Representatives and direct taxes, how apportioned. Enumeration. Vacancies to be filled. Power of choosing officers, and of impeachment.

1. The House of Representatives shall be composed of members chosen every second year by the people of the several States, and the elector in each State shall have the qualifications requisite for electors of the most numerous branch of the State Legislature.

2. No person shall be a Representative who shall not have attained the age of twenty-five years, and been seven years a citizen of the United States, and who shall not, when elected, be an inhabitant of that State in which he shall be chosen.

3. Representatives [and direct taxes]¹ shall be apportioned among the several States which may be included within this Union, according to their respective numbers, [which shall be determined by adding the whole number of free persons, including those bound to service for a term of years, and excluding Indians not taxed, three-fifths of all other persons.]² The actual enumeration shall be made within three years after the first meeting of the Congress of the United States, and within every subsequent term of ten years, in such manner as they shall by law direct. The number of Representatives shall not exceed one for every thirty thousand, but each State shall have at least one Representative; and until such enumeration shall be made, the State of New Hampshire shall be entitled to choose three, Massachusetts eight, Rhode Island and Providence Plantations one, Connecticut five, New York six, New Jersey four, Pennsylvania eight, Delaware one, Maryland six, Virginia ten, North 1. Altered by 16th Amendment
2. Altered by 14th Amendment

FIG. 10

The Constitution of the United States

PREAMBLE

We, the people of the United States, in order to form a more perfect Union, establish justice, insure domestic tranquility, provide for the common defense, promote the general welfare, and secure the blessings of liberty to ourselves and our posterity, do ordain and establish this Constitution for the United States of America.

ARTICLE I

Section 1. Legislative powers; in whom vested

All legislative powers herein granted shall be vested in a Congress of the United States, which shall consist of a Senate and House of Representatives.

Section 2. House of Representatives, how and by whom chosen Qualifications of a Representative. Representatives and direct taxes, how apportioned. Enumeration. Vacancies to be filled. Power of choosing officers, and of impeachment.

1. The House of Representatives shall be composed of members chosen every second year by the people of the several States, and the elector in each State shall have the qualifications requisite for electors of the most numerous branch of the State Legislature.

2. No person shall be a Representative who shall not have attained the age of twenty-five years, and been seven years a citizen of the United States, and who shall not, when elected, be an inhabitant of that State in which he shall be chosen.

3. Representatives [and direct taxes][1] shall be apportioned among the several States which may be included within this Union, according to their respective numbers, [which shall be determined by adding the whole number of free persons, including those bound to service for a term of years, and excluding Indians not taxed, three-fifths of all other persons.][2] The actual enumeration shall be made within three years after the first meeting of the Congress of the United States, and within every subsequent term of ten years, in such manner as they shall by law direct. The number of Representatives shall not exceed one for every thirty thousand, but each State shall have at least one Representative; and until such enumeration shall be made, the State of New Hampshire shall be entitled to choose three, Massachusetts eight, Rhode Island and Providence Plantations one, Connecticut five, New York six, New Jersey four, Pennsylvania eight, Delaware one, Maryland six, Virginia ten, North

---

1. Altered by 16th Amendment
2. Altered by 14th Amendment

FIG. 11

The Constitution of the United States

PREAMBLE

We, the people of the United States, in order to form a more perfect Union, establish justice, insure domestic tranquility, provide for the common defense, promote the general welfare, and secure the blessings of liberty to ourselves and our posterity, do ordain and establish this Constitution for the United States of America.

ARTICLE I

Section 1. Legislative powers; in whom vested.

All legislative powers herein granted shall be vested in a Congress of the United States, which shall consist of a Senate and House of Representatives.

Section 2. House of Representatives, how and by whom chosen Qualifications of a Representative. Representatives and direct taxes, how apportioned. Enumeration. Vacancies to be filled. Power of choosing officers, and of impeachment.

1. The House of Representatives shall be composed of members chosen every second year by the people of the several States, and the elector in each State shall have the qualifications requisite for electors of the most numerous branch of the State Legislature.

2. No person shall be a Representative who shall not have attained the age of twenty-five years, and been seven years a citizen of the United States, and who shall not, when elected, be an inhabitant of that State in which he shall be chosen.

3. Representatives [and direct taxes][1] shall be apportioned among the several States which may be included within this Union, according to their respective numbers, [which shall be determined by adding the whole number of free persons, including those bound to service for a term of years, and excluding Indians not taxed, three-fifths of all other persons.][2] The actual enumeration shall be made within three years after the first meeting of the Congress of the United States, and within every subsequent term of ten years, in such manner as they shall by law direct. The number of Representatives shall not exceed one for every thirty thousand, but each State shall have at least one Representative; and until such enumeration shall be made, the State of New Hampshire shall be entitled to choose three, Massachusetts eight, Rhode Island and Providence Plantations one, Connecticut five, New York six, New Jersey four, Pennsylvania eight, Delaware one, Maryland six, Virginia ten, North ---
1. Altered by 16th Amendment
2. Altered by 14th Amendment

FIG. 12

MULTI-FUNCTION MACHINE FOR COMBINING AND ROUTING IMAGE DATA

This application is a continuation-in-part of Ser. No. 07/811,463, filed Dec. 19, 1991, now issued as U.S. Pat. No. 5,396,345.

BRIEF DESCRIPTION OF THE INVENTION

This invention relates generally to a multi-function machine which is capable of reproducing an electronic image into printed matter. More particularly, this invention relates to a multi-function machine which combines two or more separate electronic images into a single image which may be printed, stored, or faxed.

BACKGROUND OF THE INVENTION

Multi-function machines have been recently developed. These machines commonly include the capability to print a digitally formatted document which is downloaded from a host computer. As is known in the art, the print function of the multi-function machine is realized by utilizing a laser and a polygon mirror to write information on a photoreceptor. The photoreceptor is subsequently placed in contact with a piece of paper which acquires the image written on the photoreceptor.

Prior art multi-function machines also commonly include the capability to digitally copy a document. As is known in the art, the digital copying aspect of these machines is realized through a Charge Coupled Device (CCD) which acquires a digital data representation of an image. The digital image data is then conveyed to the printer portion of the machine which yields a printed document.

Prior art multi-function machines may also include a capability to send and receive facsimile data. Received facsimile data is usually printed in accordance with the printer aspect of the multi-function machine. A document to be sent by facsimile is typically scanned and encoded by the CCD element of the multi-function machine.

Recently, a multi-function machine has been developed which has the capability of combining one or more individual functions. For instance, image data from a computer may be combined with a scanned image to produce a printed image. This device directly prints any merged image data. No capability is provided for routing the merged image data to other data processing devices.

OBJECTS AND SUMMARY OF THE INVENTION

It is a general object of the present invention to provide a multi-function machine capable of combining two separate images into a single electronic image.

It is a related object of the present invention to provide a multi-function machine which combines different image data into a combined image data file which may be routed to memory or to an output device such as a fax or a host computer.

These and other objects are achieved by a multi-function machine for combining and routing image data. The multi-function machine includes a number of functional units, for instance, a digital copier which produces scanned image data, a printer which prints data from a computer, and a facsimile device which receives and sends facsimile image data. Image data from one or a number of sources may be combined to form merged image data, corresponding to a merger of the individual images. The merged image data may then be conveyed to any of a number of user selectable destinations, including a printer, a host computer, or a facsimile device.

BRIEF DESCRIPTION OF THE DRAWINGS

For a better understanding of the nature and objects of the invention, reference should be made to the following detailed description taken in conjunction with the accompanying drawings, in which:

FIG. 8 is an example of a registered image selection menu that may be used in accordance with the present invention.

FIG. 9 is an example of a registered image selection menu with an identification number incrementation option.

FIG. 10 is an example of a printed document wherein the first set of image data is a page from the U.S. Constitution and the second set of image data is a pre-registered horizontal confidential statement.

FIG. 11 is an example of a printed document wherein the first set of image data is a page from the U.S. Constitution and the second set of image data is a pre-registered diagonal confidential statement.

FIG. 12 is an example of a printed document wherein the first set of image data is a page from the U.S. Constitution and the second set of image data is a pre-registered diagonal confidential statement which includes an identification number.

Like reference numerals refer to corresponding parts throughout the several views of the drawings.

DETAILED DESCRIPTION OF THE INVENTION

Figure 1:
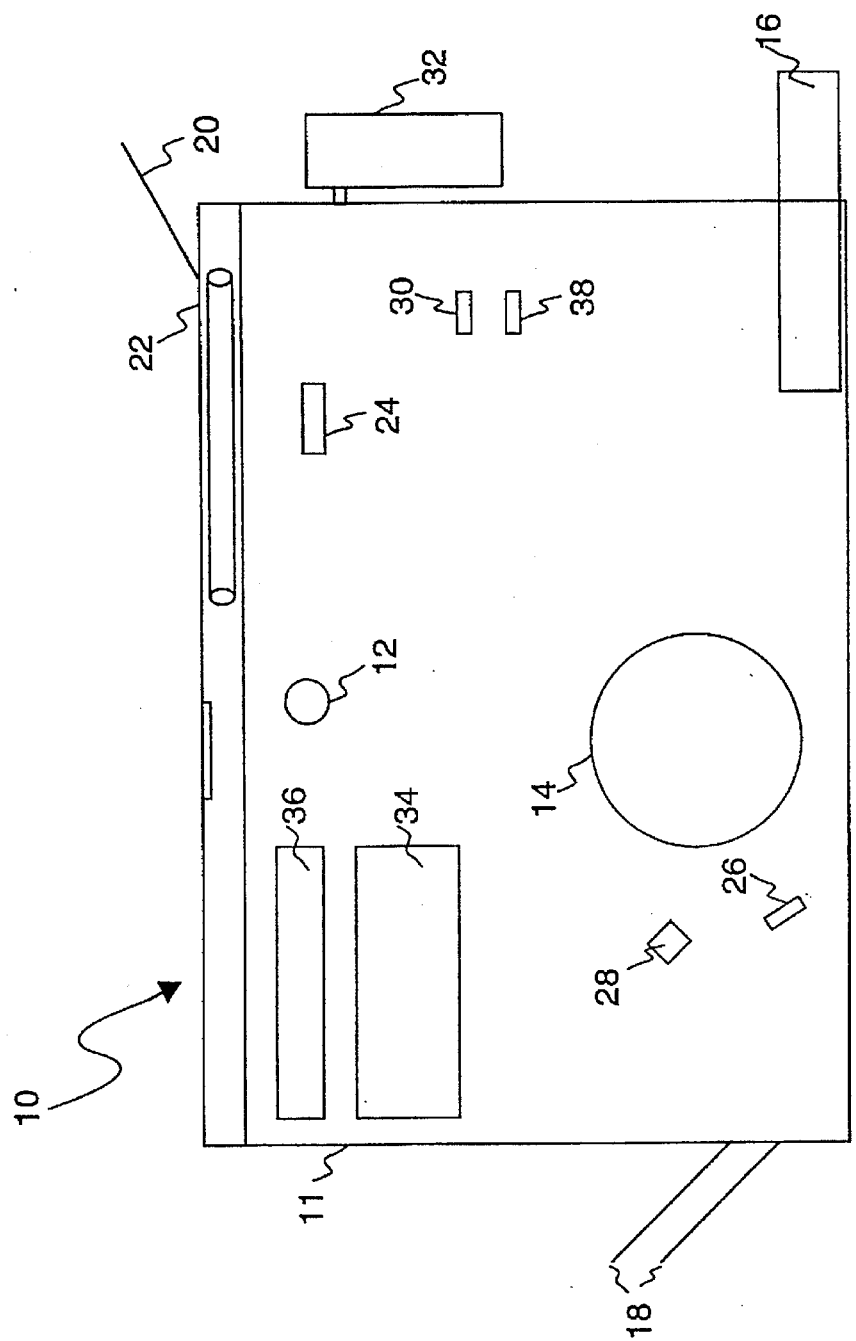
FIG. 1 is a simplified depiction of a multi-function machine which may be used in accordance with the present invention.

Referring to FIG. 1, a multi-function machine 10 is depicted. The machine 10 includes a housing 11. Within the housing 11 is a light source 12 for scanning images. The housing 11 also includes a photoreceptor 14 for creating latent images for the printer, copier and facsimile functions of the machine. A paper tray 16 and output bins 18 are also provided for the output aspect of the machine 10. A document feed 20 and automatic document transport 22 may also be provided.

The machine 10 also includes a Charge Coupled Device (CCD) to realize scanning functions. In addition, the machine 10 also includes a laser element 26 and a polygon mirror 28. The laser element 26 and polygon mirror 28 are utilized to write information on photoreceptor 14 and thereby achieve a printing function, as is known in the art. This printing function may be used in accordance with telephone input 30 to provide a facsimile capability to the machine 10. A telephone handset 32 is also provided.

In sum, the machine 10 may include a copier, a scanner, a printer, and a facsimile apparatus. Selection of the individual functions may be achieved through a control panel 34. Preferably, the machine 10 also includes an LCD 36 which provides status information. The machine 10 also includes a host interface 38 which may be coupled to a host computer. The host computer may be used to provide commands to the machine 10. Printing jobs may be conveyed from the host computer to the machine 10. In addition, scanned images may be conveyed through the host interface 38 to the host computer.

Figure 2:
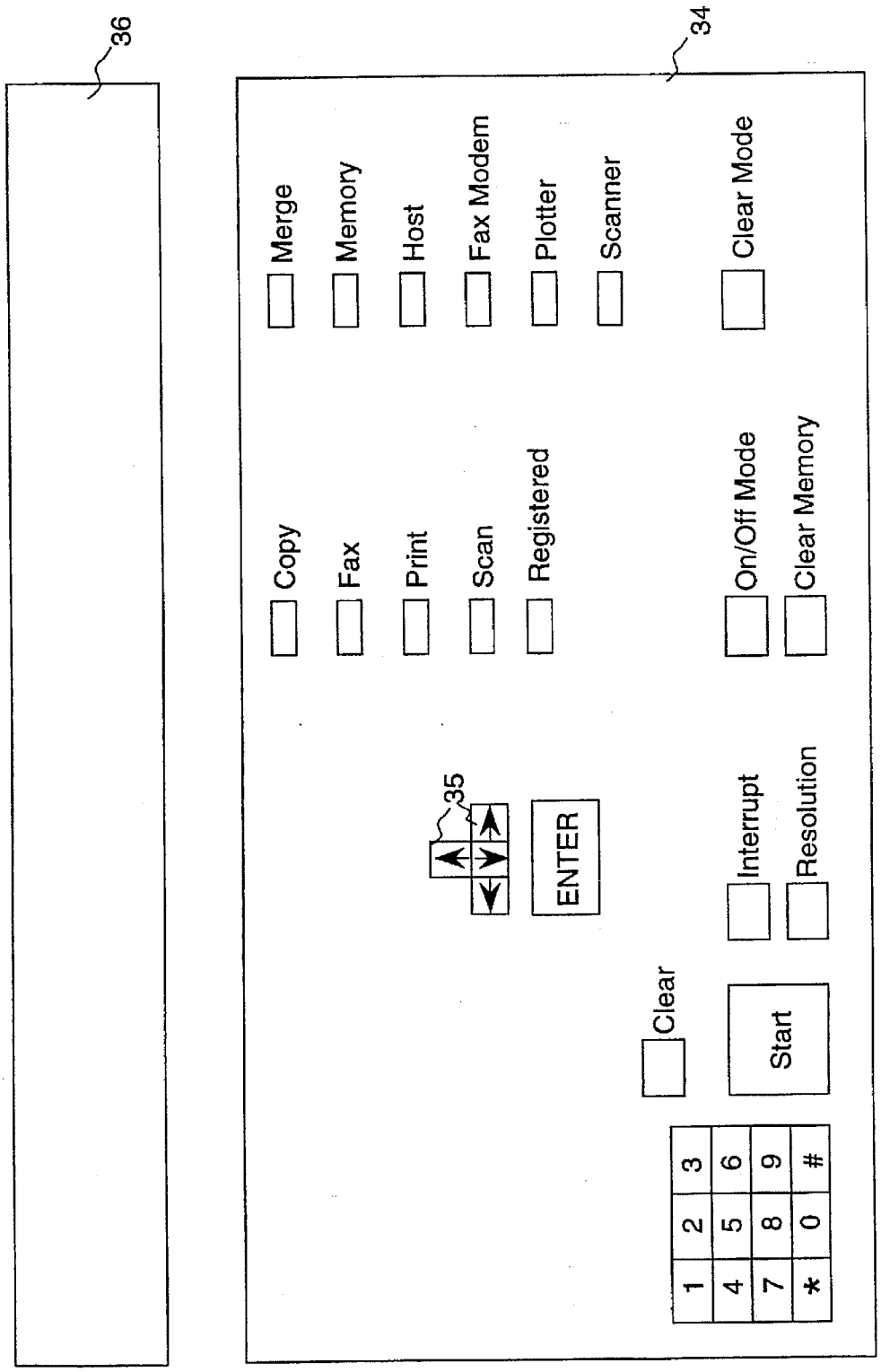
FIG. 2 is a depiction of a control panel for a multi-function machine which may be used in accordance with the present invention.

FIG. 2 depicts a control panel 34 which may be used with a multi-function machine in accordance with the present invention. As will be more fully described, the control panel 34 preferably includes a "merge" button. The control panel 34 also preferably includes a number of operations such as "copy", "print", and "fax". Status information is provided on LCD 36.

Figure 3:
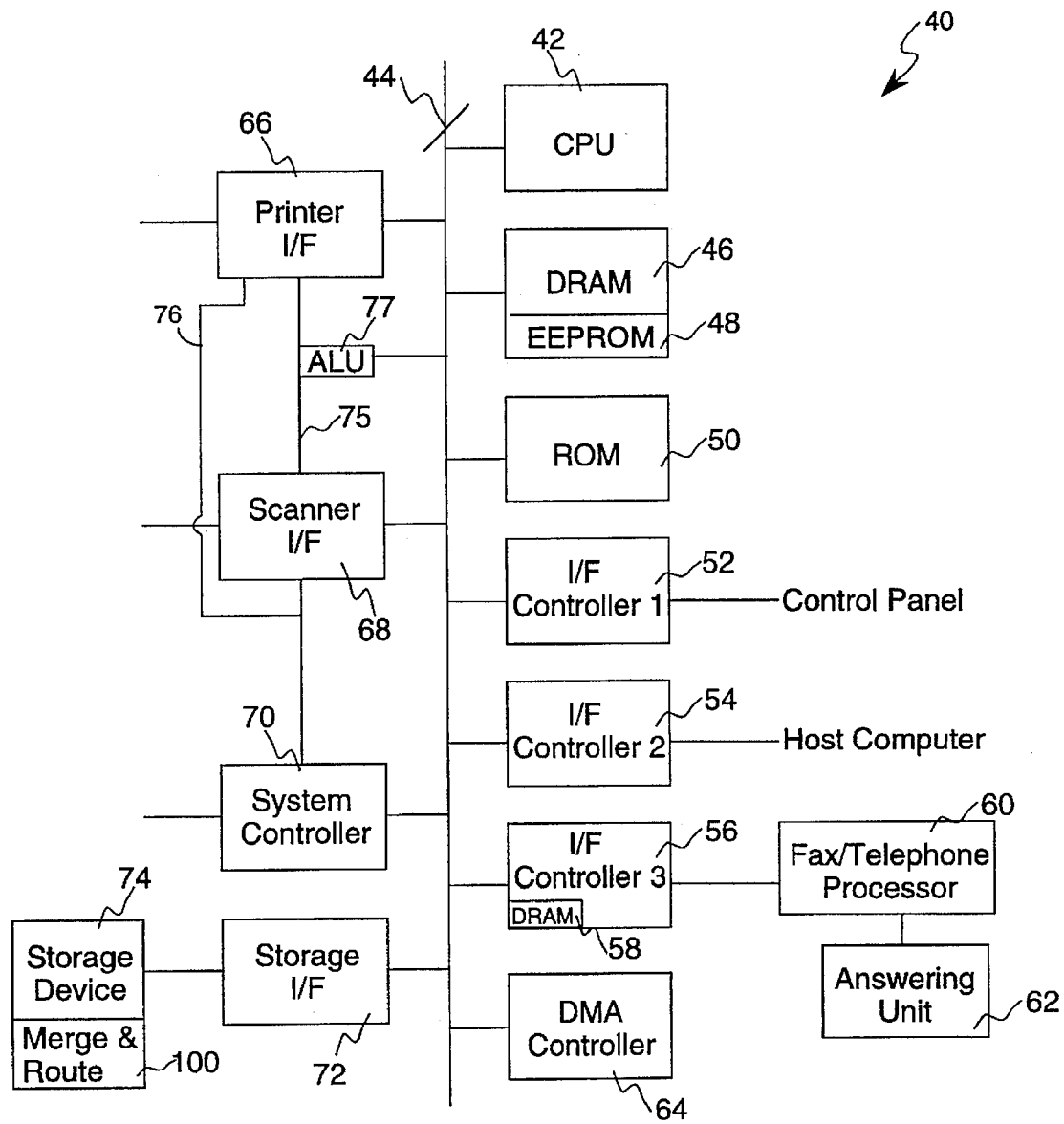
FIG. 3 is a block diagram of an electronic system board of a multi-function machine which may be used in accordance with the present invention.

Turning to FIG. 3, a block diagram of the primary electronic components 40 of the machine 10 is provided. System bus 44 connects all the modules of the system. CPU 42 services multiple tasks while monitoring the state of the machine. DRAM 46 and EEPROM 48 are preferably provided. ROM module 50 includes initial values, default values, and firmware. The firmware may include printing instructions to handle popular printer commands such as PCL5 from Hewlett-Packard or PostScript from Adobe Systems. Interface controller 1 (52) is coupled to control panel 34. Interface controller 2 (54) is preferably coupled to a host computer through host interface 38.

Interface controller 3 (56) includes DRAM 58 and is coupled to fax/telephone processor 60. Preferably, the fax/telephone processor 60 has a module which distinguishes the incoming information as either voice or fax data, and automatically switches the system to the appropriate mode by notifying the CPU 42. The fax/telephone processor 60 is coupled to telephone handset 32 to handle voice information. Interface controller 3 (56) is preferably coupled to an answering unit 62.

A direct memory access controller 64 is also provided. Printer interface 66 is coupled to the printing elements (laser 26, polygon mirror 28, and photoreceptor 14) to create the desired output image. Scanner interface 68 interfaces with the CCD 24 so that scanned digital images can be obtained. System controller 70 is connected with scanner interface 68 and printer interface 66 through bus 44 and bus 76, which allows the input-output related functions such as copying. For copying, bus 75 provides an interface between the scanner and printer which enables the movement of image data.

Arithmetic Logic Unit (ALU) 77 is used to merge data from the scanner interface 68 with data from other sources "on the fly", as the scan data is being sent to the printer interface 66. In addition, merge data from the scanner can be directed to DRAM 46, either for temporary storage or for merging with other image data already stored in DRAM 46.

Storage interface 72 is coupled to external storage units 74, which may be hard disks, optical disks, and/or floppy disks. The storage device 74 may store sets of instructions to be used in accordance with the invention. In the alternative, these instructions may be stored in ROM 50.

Figure 4:
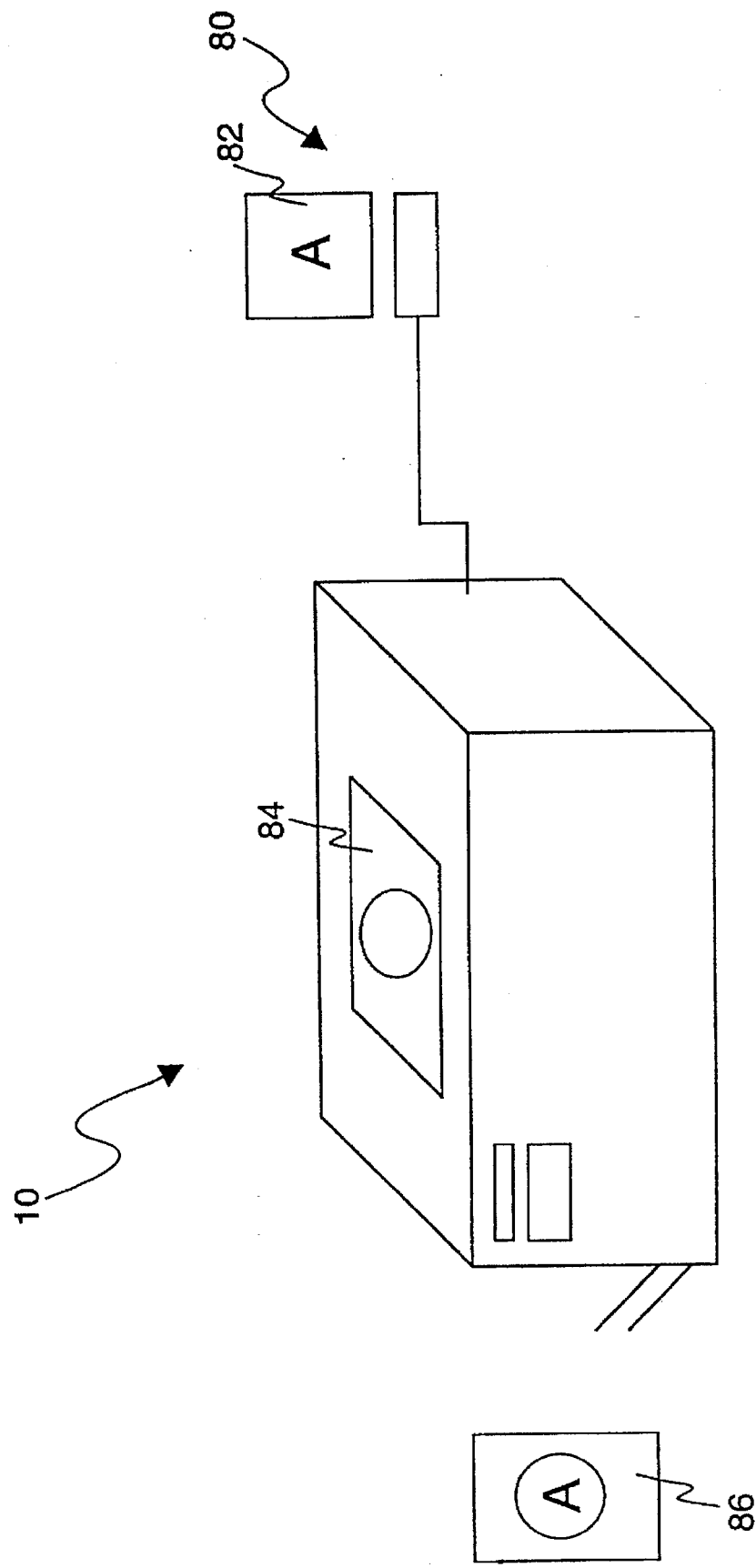
FIG. 4 is a simplified depiction of the merge process between computer image data and scanned image data.

The combination of image data is illustrated in reference to FIG. 4. Multi-function machine 10 is coupled to a host computer 80. Host computer 80 includes a monitor 82 which depicts data in the form of the letter "A". On the platten of multi-function machine 10 is a document 84 which includes a "circle". The document 84 is electronically scanned and the resultant scanned image data is combined with the image data from the computer corresponding to the letter "A". The resultant merged image is printed on paper 86. As is known in the art, host computer 80 may convey image data to the multi-function machine 10 or coded data which must be converted by the multi-function machine 10 (through known techniques such as coding "A" as Hex 41) to image data. As used herein, "image data" from the host computer refers to either class of data.

Figure 5:
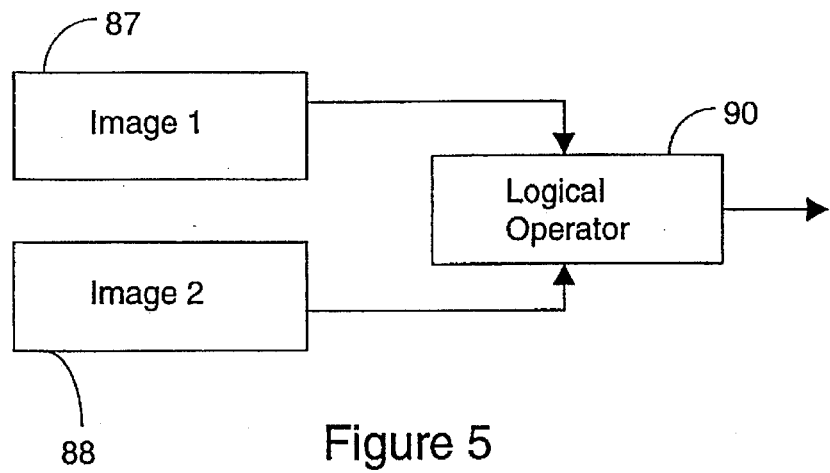
FIG. 5 is a simplified block depiction of the merge operation.

FIG. 5 is a simplified depiction of this merge process. In a sequential fashion, each pixel (picture element) of image 1 (87) is combined with the corresponding positional pixel in image 2 (88) by a logical operator 90. For instance, starting with the pixel in the upper left corner of image 1 (87), this pixel is combined with the pixel in the upper left corner of image 2 (88). Subsequently, the remaining pixels in image 1 (87) are combined with the corresponding positional pixels in image 2 (88). Typically, the logical operator is an "OR" operation. That is, the logical operator receives two pixels, one from each image, if either of the two pixels is dark, the output is dark, otherwise the output is light. If desired, the logical operator may also be an "AND", "OR", "NOT", or a "XOR" operator. The logical operation is preferably user selectable through the operation panel 34 or through the host computer.

This merge function is known in the art. However, in the prior art, the merged image always results in a printed document. In accordance with the present invention, the merged image data may be conveyed to any of a number of user selectable output destinations.

Figure 6:
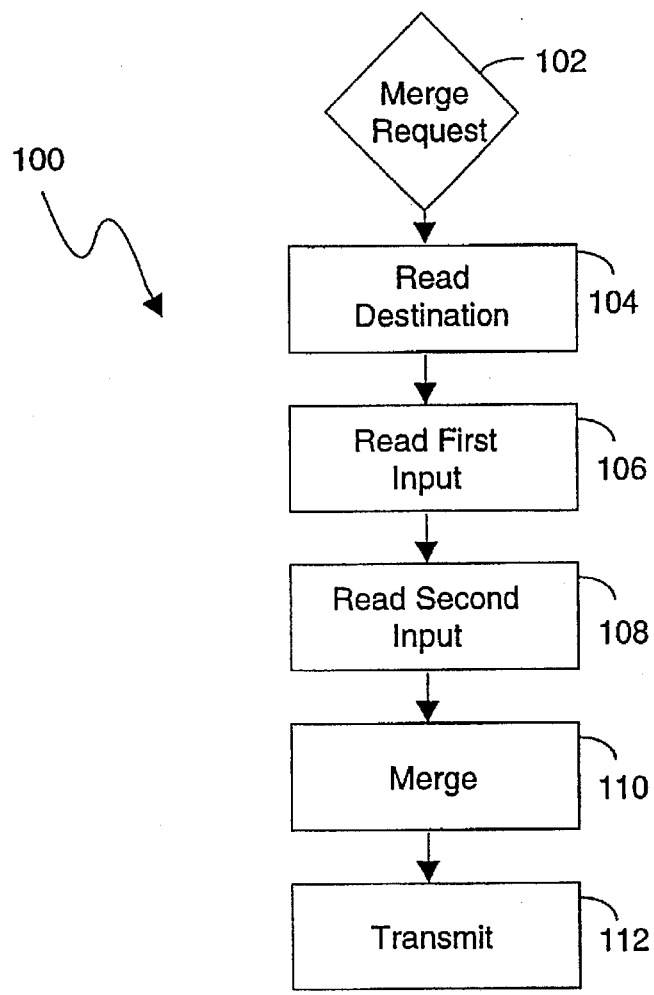
FIG. 6 is a flow chart depicting the merging operations of the present invention.

The operation of a multi-function machine in accordance with the present invention is more fully described in relation to FIG. 6. The merge and route operation 100 of the present invention begins with a merge request (block 102). The merge request may be initiated from the "Merge" button on the operation panel 36 or from host computer 80. In either event, a prompt is provided to input the routing destination (block 104). The prompt may be provided on LCD 36, or on the monitor 82 of host computer 80. The routing destination is where the merged image data is sent. For instance, the merged image data may be sent to the printer for printing, to the host computer, to DRAM, to a storage device, or to the facsimile, as to be more fully described below.

The multi-function machine 10 then provides a prompt to read the first input (block 106). As before, the prompt may be provided on LCD 36, or on the monitor 82 of host computer 80. The first input may be image data from host computer 80, scanned image data, or stored facsimile image data.

The multi-function machine 10 then provides a prompt to read the second input (block 108). The prompt may be provided on LCD 36, or on the monitor 82 of host computer 80. The second input may be any of a number of classes of image data, as was the case with the first input.

Subsequently, the merge operation transpires (block 110). The nature of the merge operation has been described in relation to FIGS. 4 and 5, and will be more fully described below.

Finally, the merged data is transmitted to the user selectable destination (block 112). The destination was previously determined at block 104. Thus, the merged image data is routed to any of a number of locations including the printer, the host computer, DRAM, an optional disk, or the facsimile output.

The particular execution of these instructions on the multi-function machine 10 is more fully appreciated with reference to FIG. 3. The merge request is received by CPU 42 via bus 44 through either interface controller 1 (52), in the case of a request from the control panel 34, or through interface controller 2 (54), in the case of a request from the host computer 80.

The merge and route routine 100 of FIG. 6 is stored by storage device 74. In the alternative, merge and route routine 100 may be stored in ROM 50, DRAM 46, or EEPROM 48. Regardless of where the merge and route routine 100 is stored, CPU 42 executes the appropriate instructions corresponding to the routine. Thus, the merge request block 102 of FIG. 6 invokes the merge and route routine 100.

The instructions of the routine provide a prompt for the destination of the merged data. This prompt is sent by bus 44 through interface controller 1 (52) or through interface controller 2, depending upon where the merge request originated from. In the case of an instruction routed through interface controller 1, a prompt is provided on LCD 36. For instance, a suitable prompt would be "Enter Merged Data Destination". The data destination would then be entered through the use of one of the control panel 34 keys, for instance, the "print" key, or by using the cursor control keys 35 on the control panel 34.

An analogous procedure is undertaken in the case of an instruction routed through interface controller 2. In this instance, the prompt is provided on computer monitor 82 of host computer 80. The data destination would then be entered through the keyboard or mouse associated with the host computer. In either embodiment, the destination is read and stored in one of the memory devices (DRAM 46 or storage device 74).

Subsequently, prompts are provided in an analogous manner for the first input and the second input. The first and second inputs are read and stored in one of the memory devices.

Afterwards, the merge instruction is executed. The merge instruction may be executed in any of a number of manners. For instance, the first input may be fax image data which is stored in DRAM 58. The second input may be image data from host computer 80. CPU 42 will consider each pixel from the respective inputs and perform the required logical operation. The merged image data output from the logical operation may be conveyed to DRAM 46 or storage device 74 until the merge operation is completed. Thereafter, the CPU 42 uses the stored user-selected destination to create a route command. Thus, if the merged image data of the present example is to be routed to the facsimile output, then the CPU 42 would provide instructions to move the stored image data over bus 44 through interface controller 56 into fax processor 60.

Merging may also be performed without subsequent storing of the merged image data. For instance, if image data from a host computer is to be merged with scanned imaged data, the merged image data may be directly routed to the printer, without storing. An Arithmetic Logic Unit (ALU) 77 may be provided to receive image data from bus 44. The image data from bus 44 may be received from host computer 80 through interface controller 54. The ALU provides a logical operation with data received from the scanner interface 68. The output from the ALU is then fed directly to the printer interface 66 for subsequent printing. The ALU and printer interface 66 may also be used to route the merged image data onto bus 44 for conveyance to another output device, such as host computer 80.

Similarly, the CPU 42 can merge image data in the DRAM 46 from a first source with image data from a second source (e.g., the scanner 68) and send that merged data directly to a specified destination (such as a host computer via interface 54) without storing the merged image in DRAM 46.

Figure 7:
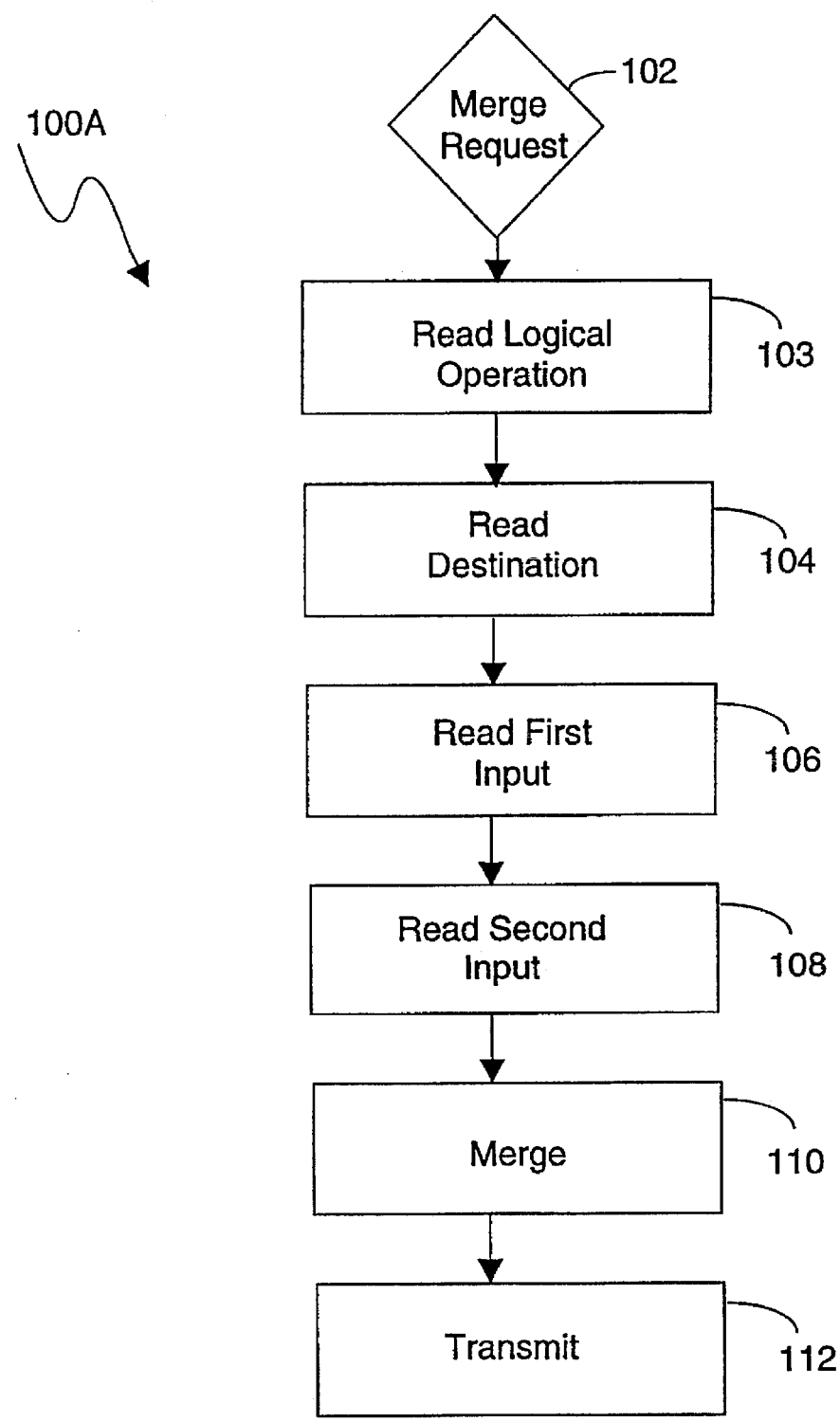
FIG. 7 is a flow chart depicting an alternate embodiment of the merging operations of the present invention.

FIG. 7 depicts an alternate embodiment of the present invention. Instead of relying upon a default logical operator, such as the "OR" function, in accordance with this embodiment, a logical operator is selected. After the merge request (block 102), a prompt may be provided (block 103) on LCD 36 or on monitor 82 of host computer 80 to input a logical operation, such as "AND", "OR", "NOT" or "XOR". Thereafter, all steps would be performed in accordance with the previously disclosed embodiment.

One of the images to be merged during a merge operation in accordance with the invention may be a "registered" image. FIG. 2 illustrates a "registered" key to select a registered image. When the registered key is pressed, the LCD 36 displays a registered image selection menu. By way of example, FIG. 8 illustrates a set of available registered images on a registered image selection menu. A registered image may be selected using a corresponding number from the number pad on the control panel 34.

The first available registered image is a "Confidential" statement that is positioned horizontally, as indicated by the (H), on the merged document. The second available registered image is a "Confidential" statement that is positioned diagonally, as indicated by the (D), on the merged document. A registered date stamp (option 3) and a combination of a date stamp and time stamp (option 4) are also available. The first and second registered image options may be stored in EEPROM 48. The date and time stamp may be formed by relying upon the system clock that is used by the CPU 42. The date and time stamp is preferably positioned at the top or bottom of the document.

A fifth option that is preferably available is an identification number. When the identification number option is selected, the LCD display 36 is changed to provide a menu as shown in FIG. 9. Preferably, there is a prompt to enter an identification number. The identification number may be entered by using the number pad on the control panel 34. The entered number is then stored in DRAM 46 and merged with a second image. The identification number, say on a printed document, is used to ascribe the document to an individual assigned to the identification number.

Preferably, an option is provided to increment the identification number, as illustrated in FIG. 9. When this option is selected, the first merged document has the entered identification number, the next merged document has the entered identification number incremented by one, etc. The incrementation operation may be executed by the CPU 42. This option is useful, for instance, when the second document to be merged is a single document that needs to be copied several times. The incrementation of the identification number allows one to keep track of the different copies made.

The identification number feature of the invention may be combined with other registered images. For example, the identification number may be combined with a horizontal confidential statement (option 6), or the identification number may be combined with a diagonal confidential statement (option 7).

As indicated above, selection of a registered image is analogous to the selection of any other image to be merged. For example, returning to FIG. 6, a merge request is made (block 102) and then the merge destination is selected (block 104). By way of example, the first input read (block 106) may be a copy, and the second input read (block 108) may be a registered image, as selected from the registered image selection menu of FIG. 8. Thereafter, the merge operation is executed (block 110) and the merged document is transmitted (block 112).

FIG. 10 is an example of a printed document which has a pre-registered confidential statement merged therein. In particular, FIG. 10 illustrates one page from the U.S. Constitution, which may be viewed as a first set of electronic image data, for instance obtained from the copier of the multi-function machine 10. FIG. 10 also includes a pre-registered horizontally-oriented confidential statement ("Confidential Don't Make Copy"), which may be viewed as a second set of electronic image data, selected as item 1 in FIG. 8. FIG. 11 is similar to FIG. 10, but the confidential statement is oriented diagonally. This option is available as item 2 in FIG. 8. FIG. 12 is similar to FIG. 11, but further includes an identification number ("19"). The identification number may be selected as item 5 in FIG. 8, and may then be keyed in, as shown in FIG. 9.

FIGS. 10–12 show the merged image data as being directly printed. However, as previously indicated, the merged image data may also be routed to any of a number of user selectable destinations. Thus, the multi-function machine of the present invention provides a flexible merge and route operation.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. A multi-function machine, comprising:

means for superimposing a first set of electronic image data over a second set of electronic image data on a pixel-by-pixel basis to form superimposed image data, wherein either said first set of electronic image data or said second set of electronic image data is registered image data and wherein said registered image data is selected from a registered image selection menu, and wherein said superimposing means superimposes said first set of electronic image data over said second set of electronic image data on said pixel-by-pixel basis by executing a logical operation between pixels of said first set of electronic image data and corresponding pixels of said second set of electronic image data; and means for conveying said superimposed image data to a printer.

2. The multi-function machine of claim 1 wherein said logical operation is a logical OR operation.

3. The multi-function machine of claim 1 wherein said logical operation is selected from the group including a logical AND operation, a logical NOT operation, and a logical XOR operation.

4. The multi-function machine of claim 1 wherein said logical operation is selected from an operation panel.

5. The multi-function machine of claim 1 wherein said logical operation is selected from a host computer.

6. The multi-function machine of claim 1 wherein said first set of electronic image data and said second set of electronic image data is selected from the group including: facsimile image data, scanned image data, or image data based upon host computer data.

7. The multi-function machine of claim 1 wherein said registed image selection menu includes a confidential imprint option, a data stamp option, a date and time stamp option, and an identification number option.

8. The multi-function machine of claim 7 wherein said identification number option includes an identification number incrementation option.

9. The multi-function machine of claim 1 wherein said first set of electronic image data is generated by said multi-function machine from coded data received from a host computer.

10. A multi-function machine, comprising:

means for receiving a merge command:

means, responsive to said receiving means, for reading one of a plurality of user selectable logical operations;

means, responsive to said receiving means, for accepting one of a plurality of user selectable merge destinations within said multi-function machine;

means, responsive to said receiving means, for identifying a source of a first set of digital data;

means, responsive to said receiving means, for selecting a source of a second set of digital data, wherein said source of said first set of digital data or said second set of digital data includes registered image data:

means, responsive to said receiving means, for executing a merge operation according to said user selectable logical operation, wherein said first set of digital data is merged with said second set of digital data to form merged image data; and means for transmitting said merged image data to one of said merge destinations.

11. The multi-function machine of claim 10 wherein said registered image data is selected from a registered image selection menu.

12. The multi-function machine of claim 11 wherein said registered image selection menu includes at least one of the following registered image options: a confidential imprint option, a date stamp option, a date and time stamp option, and an identification number option.

13. The multi-function machine of claim 12 wherein said identification number option includes an identification number incrementation option.

14. A method of operating a multi-function machine, comprising the steps of:

receiving a merge command;

reading data representing one of a plurality of user selectable merge destinations within said multi-function machine;

identifying a first set of digital image data;

selecting a second set of digital image data from a registered image selection menu;

executing a merge operation wherein said first set of digital image data is merged with said second set of digital image data to form merged image data; and transmitting said merged image data to one of said merge destinations.

15. The method of claim 14 wherein said registered image selection menu of said selecting step includes at least one of the following registered image options: a confidential imprint option, a data stamp option, a data and time stamp option, and an identification number option.

16. The method of claim 15 wherein said registered image selection menu of said selecting step includes an identification number incrementation option.

17. The method of claim 14 further including the step of reading one of a plurality of user selectable logical operations to generate a selected logic operation which is executed during said executing step to merge said first set of digital image data and said second set of digital image data.

18. A multi-function machine, comprising:

means for merging a first set of electronic image data with a second set of electronic image data to form merged image data, wherein either said first set of electronic image data or said second set of electronic image data is registered image data, wherein said registered image data is selected from a registered image selection menu including at least one of the following registered image options: a confidential imprint option, a data stamp option, a data and time stamp option, and identification number option, wherein said identification number option includes an identification number incrementation option; and means for conveying said merged image data to one of a plurality of user selectable destinations within said multi-function machine.

19. A multi-function machine, comprising:

means for merging a first set of electronic image data with a second set of electronic image data to form merged image data, wherein either said first set of electronic image data or said second set of electronic image data is registered image data selected from a registered image selection menu;

means for reading one of a plurality of user selectable logical operations to generate a selected logic operation which is executed by said merging means when merging said first set of electronic image data with said second set of electronic image data; and means for conveying said merged image data to one of a plurality of user selectable destinations within said multi-function machine.

20. The apparatus of claim 10 further including means for reading one of a plurality of user selectable logical operations to generate a selected logic operation which is executed by said merging means when merging said first set of digital data with said second set of digital data.

21. A method of operating a multi-function machine, comprising the steps of:

receiving a merge command;

reading data representing one of a plurality of user selectable merge destinations within said multi-function machine;

identifying a first set of digital image data;

selecting a second set of digital image data;

executing a merge operation wherein said first set of digital image data is merged with said second set of digital image data to form merged image data; and transmitting said merged image data to one of said merge destinations.

22. The method of claim 21 further including the step of reading one of a plurality of user selectable logical operations to generate a selected logic operation which is executed during said executing step to merge said first set of digital image data and said second set of digital image data.

* * * * *